United States Patent [19]

Mattson

[11] 4,204,521

[45] May 27, 1980

[54] SOLAR ENERGY TRACKING COLLECTOR

[75] Inventor: John P. Mattson, Duxbury, Mass.

[73] Assignee: Solarspan, Inc., Duxbury, Mass.

[21] Appl. No.: 914,388

[22] Filed: Jun. 12, 1978

Related U.S. Application Data

[63] Continuation-in-part of Ser. No. 649,032, Jan. 14, 1976, Pat. No. 4,077,393.

[51] Int. Cl.² ............................................. F24J 3/02
[52] U.S. Cl. .................................. 126/446; 126/448; 126/450; 165/171
[58] Field of Search ............... 126/270, 271; 237/1 A; 165/81, 171

[56] References Cited

U.S. PATENT DOCUMENTS

| | | | |
|---|---|---|---|
| 3,916,871 | 11/1975 | Estes | 126/271 |
| 3,995,615 | 12/1976 | Hojnowski | 126/271 |
| 4,078,547 | 3/1978 | Malecek | 126/271 |

FOREIGN PATENT DOCUMENTS

938012 9/1963 United Kingdom ................... 126/271

Primary Examiner—James C. Young
Attorney, Agent, or Firm—Edward A. Gordon

[57] ABSTRACT

A solar energy receiving surface having a heat exchange fluid conduit for circulating a heat exchange fluid in contact with the energy receiving surface is positioned between and thermally insulated from an upper and a lower cover, the lower cover serving as a base, and the upper cover, serving as a fixed tracking system, is provided with a multiplicity of raised surfaces which trap and collect incident solar radiation and direct it to the energy receiving surface. In the preferred embodiment the collector is evacuated to provide greater thermal insulation efficiency. Other conduits are provided to introduce a heat exchange fluid and to receive or collect the fluid after it has been in heat exchange contact with the energy receiving surface.

6 Claims, 6 Drawing Figures

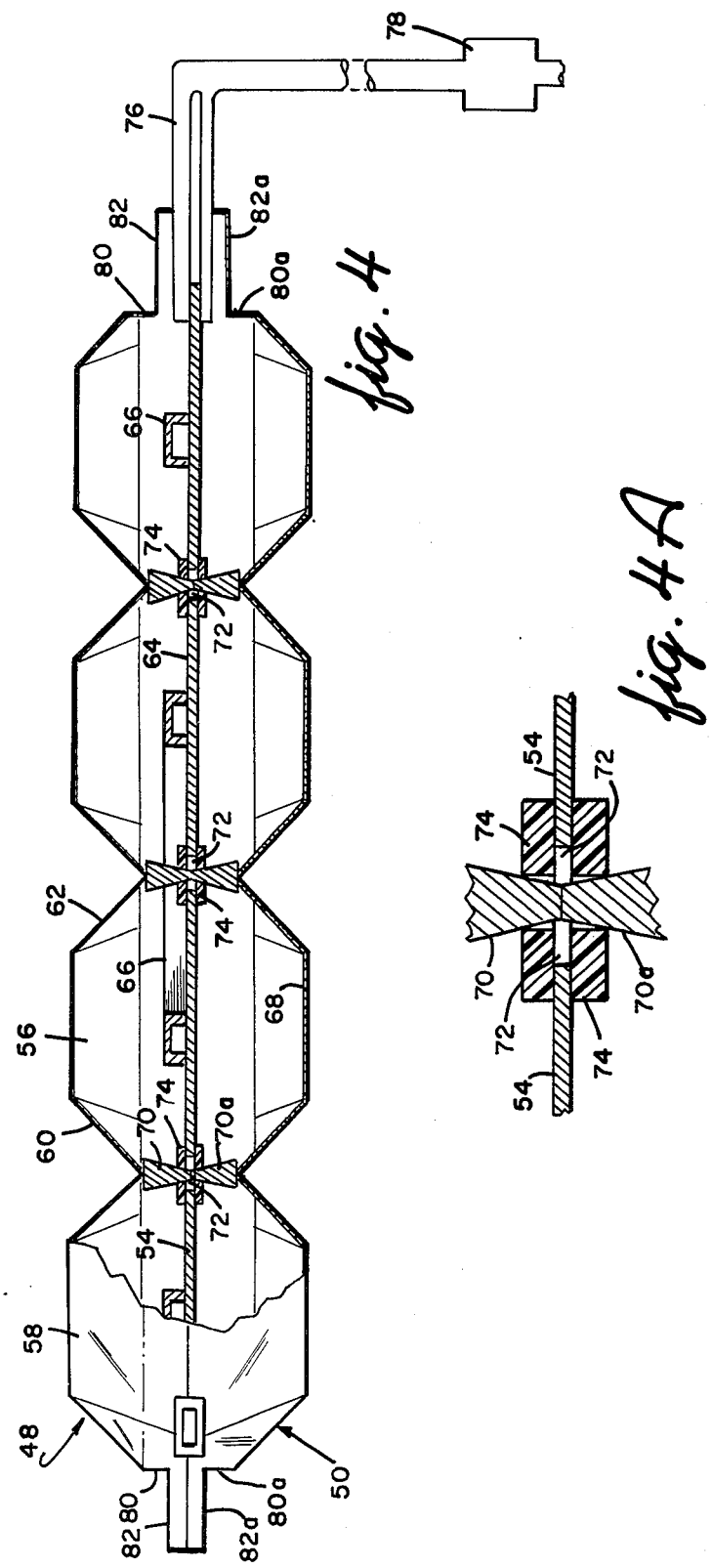

SOLAR ENERGY TRACKING COLLECTOR

This application is a continuation in part of my co-pending application Ser. No. 649,032 filed Jan. 14, 1976, now U.S. Pat. No. 4,077,393, and entitled: Solar Energy Heat Collector.

BACKGROUND OF THE INVENTION

1. Field of the Invention

This invention relates to an apparatus for collecting radiant solar energy and more particularly to a high efficiency solar energy collector which can be attached to a surface without regard to direction or angle of the surface upon which the collector is positioned and provides for fixed tracking of incident solar energy.

2. Description of the Prior Art

There have been numerous systems proposed for the utilization of solar energy which generally comprise a collector unit which directs solar energy on an energy receiving means which may be an evaporator unit or a conduit for a heat exchange medium.

Unlike conventional fuel burning systems, such solar devices provide a non-polluting source of usable energy. In many prior art systems large black aluminum collectors absorb the sun's energy beneath flat rigid sheets of plastic or glass. In these systems the flat sandwich-like assembly in the 45° north latitude area is positioned to be aimed due south and tilted at an angle of 45 degrees. While such flat solar energy collector assemblies can be installed on an existing building with a flat roof surface, it is not readily adaptable to existing structures having inclined roofs, and are particularly not suitable for inclined roofs which do not run in a generally east-west direction, for example, since they are then unable to utilize the total solar energy available. In such instances installation may require the giving up of land around the building. For industry, as well as the homeowner, the giving up of land may be too high a price to pay for lower heating costs.

In other prior systems one or more reflector units are mounted on a framework which changes its inclination in dependence upon the elevation of the sun, thereby assuring that the reflected solar energy will always be directed at the energy receiving means. These previous systems impose severe restrictions on the size of the reflector assembly since it must be capable of swinging movement in a vertical plane to provide tracking of the solar energy.

In other prior systems the tracking of the solar energy is accomplished by changing the position of the collector requiring expensive mechanical systems.

Still other prior systems do not provide for simple high efficiency solar collectors thermally insulated by vacuum.

The foregoing prior art, while providing solar energy collectors does not provide a high efficiency solar energy tracking collector which is readily adaptable to the surface or structure to which it is to be positioned while still providing effective collection of radiant solar energy.

It is therefore, the desire of this invention to provide a high efficiency apparatus for tracking and collecting radiant solar energy and which is readily adaptable to a surface regardless of its location and pitch to provide effective collection of radiant energy without expensive mechanical tracking systems.

It is also desirable to provide a radiant solar energy collector which provides structural rigidity and simple light-weight construction and which can be evacuated to provide greater thermal insulation efficiency.

It is also desirable to provide a radiant solar energy collector capable of simple modular construction, stylish in appearance, which can be installed in existing roofs regardless of location or pitch.

SUMMARY OF THE INVENTION

The above described disadvantages of the prior art and the desired objects of a high efficiency solar energy tracking collector are met by the present invention.

In accordance with the present invention, a solar energy receiving surface having a heat exchange fluid conduit for circulating a heat exchange fluid in contact with the energy receiving surface is positioned between and thermally insulated from an upper and a lower cover, the lower cover serving as a base, and the upper cover serving as a fixed tracking system is provided with a multiplicity of raised surfces which trap and collect incident solar radiation and direct it to the energy receiving surface. In the preferred embodiment the collector is evacuated to provide greater thermal efficiency. Other conduits are provided to introduce a heat exchange fluid and to receive or collect the fluid after it has been in contact with the energy receiving surface.

In some preferred embodiments of the invention, the upper cover of the solar collector is molded or formed as one integral sheet having a plurality of raised multifaced prismatic-like structures which transmit solar radiation to the energy receiving surface. The rased multifaced prismatic-like structures will be referred to hereinafter as prisms for simplicity of discussion and is not used in a limiting sense. The prisms may have a variety of shapes and configurations for reasons which will be explained in greater detail hereinafter. The faces of the prisms are so arranged and constructed with respect to angle and direction for a given latitude of the earth's surface to provide for optimum transmission of incident solar radiation. Since the angle of maximum insulation varies from summer to winter due to the axis of the earth's rotation being tilted or inclined to the axis of its path around the sun by $23\frac{1}{2}°$, prisms with the proper configuration of angle and direction are provided to produce optimum collectors of incident solar radiation. The surfaces of the prisms also serve to collect incident solar radiations, which would normally be lost by reflection, by multiple reflections from adjacent prism surfaces and directing them to the energy or heat absorbing surface.

As mentioned above, the tilting of the earth has the result that, with reference to the North Pole, the axis tilts toward the sun on June 21, the Summer Solstice, and away from in on Dec. 21, the Winter Solstice. The effect of the inclination of the axis of rotation on the angle of incidence of the sun rays is that on June 21 the sun's rays are perpendicular to the earth's surface at latitude $23\frac{1}{2}°$ North. On Dec. 21, the situation is reversed and the sun's rays are perpendicular to the earth at latitude $23\frac{1}{2}°$ South. Thus it can be seen that at 45° N. latitude, for example, the sun's maximum height above the horizon at local noon is $21\frac{1}{2}°$ on Dec. 21, and $68\frac{1}{2}°$ on June 21. Thus the angle for optimum intensity of solar radiation varies with seasonal changes.

In some preferred embodiments of the invention the collector is constructed so that configuration direction and angle of surfaces of certain prisms are optimum for the Winter Solstice of the sun and the configuration, direction and angle of surfaces of certain other prisms are optimum for the Summer Solstice of the sun. It is understood that the east to west movement of the sun resulting from the earth's rotation is accommodated for by the directions of the principle prism surface.

In some preferred embodiments, the collector is provided with a plurality or series of prisms, each of which series are designed to provide optimum collection of incident solar radiation over a particular angular movement of the sun with respect to the local position of the collector. As the sun changes its angular relationship, another series of prisms will collect the optimum incident solar radiation. The different prisms may be arranged in tiers, series, parallel, or combinations thereof, for example, to achieve maximum collection. Thus the solar collector of the present invention provides for fixed tracking of the sun during the east to west travel and during the seasonal variations.

In accordance with the invention, the energy receiving surface or heat absorber plate is interposed between the prism containing cover and the base by a series of opposing point contacts supports which extend from the cover and the base through apertures in the heat absorber plate, or absorber plate mount holes. At the point of contact washer means are provided which engage the absorber plate about the outer circumference and the support contacts about the inner circumference. The washer means is formed of a high temperature resistance, thermally non-conductive material. Thus, the energy receiving surface (heat absorber plate) is thermally insulated from loss of heat by conduction and is in effect a floating absorber plate with respect to such loss of heat by conduction.

In some preferred embodiments of the invention the bottom cover of the collector is similar to the top cover in configuration and material. The bottom cover is then inverted and sealed to the upper cover with energy receiving surface supported between in the manner described above. This embodiment is particularly suitable for evacuating to provide a vacuum about the energy receiving surface as will be explained in greater detail hereinafter. The vacuum provides for reduction of heat loss from the heat absorber plate through conduction and convection of ambient gases.

In still other embodiments the energy receiving surface or heat absorber plate is formed with the same configuration as the top cover including the prisms and surfaces thereof. The absorber plate is then positioned between the cover and the base so that the planes of corresponding prism surfaces are parallel with each other. Such orientation of the cover and absorber plate is preferable for maximum intensity of solar energy, having an angle of incidence normal to the parallel prism surface.

Many of the above described features of the invention may be utilized independently of some of the others, but they are preferably combined into one embodiment which is highly efficient in converting incident solar energy into heat.

The invention accordingly comprises the apparatus possessing the construction, combination of elements and arrangement of parts which are exemplified in this disclosure and the scope and application of which will be indicated in the claims.

DESCRIPTION OF THE PREFERRED EMBODIMENTS

For a fuller understanding of the nature and desired objects of the invention, reference should be had to the following detailed description taken in connection with the accompanying drawing wherein like reference characters denote corresponding parts throughout the several views and wherein:

FIG. 4 is perspective, partly schematic sectional view with parts broken away of a vacuum solar energy collector in accordance with the present invention.

FIG. 4A is an enlarged, fragmentary schematic sectional view of the support structure for the energy receiving surface.

Figure 1:
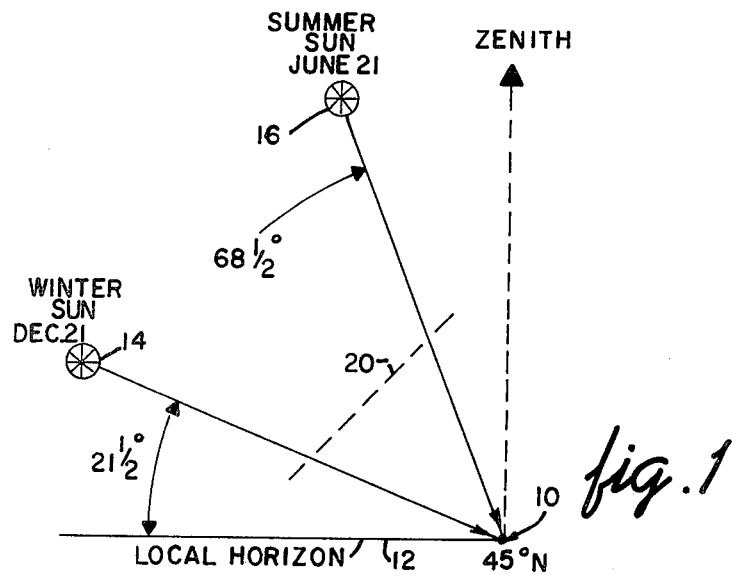
FIG. 1 is a schematic representation of the angle of incidence of solar energy as a function of the annual variation from winter to summer at 45° N. Latitude.

Referring now more particularly to FIG. 1, there is illustrated the effect on incident solar radiation from the tilting of the earth on its axis or rotation. As mentioned previously, on June 21, the summer solstice, the sun's rays are perpendicular to the earth's surface at latitude 23¼° North, and on Dec. 21 the sun's rays are perpendicular to the earth at latitude 23¼° South. At 45° N. latitude, as shown at 10, the sun's maximum height above the local horizon 12 is 21½° on Dec. 21, position 14, and 68½° on June 21, position 16. Thus it can be seen that angle for optimum intensity of solar radiation varies from winter sun to summer sun. Thus it can be understood that optimum collection of solar radiation would be obtained by tracking the sun's increment relative to the earth.

Figure 2:
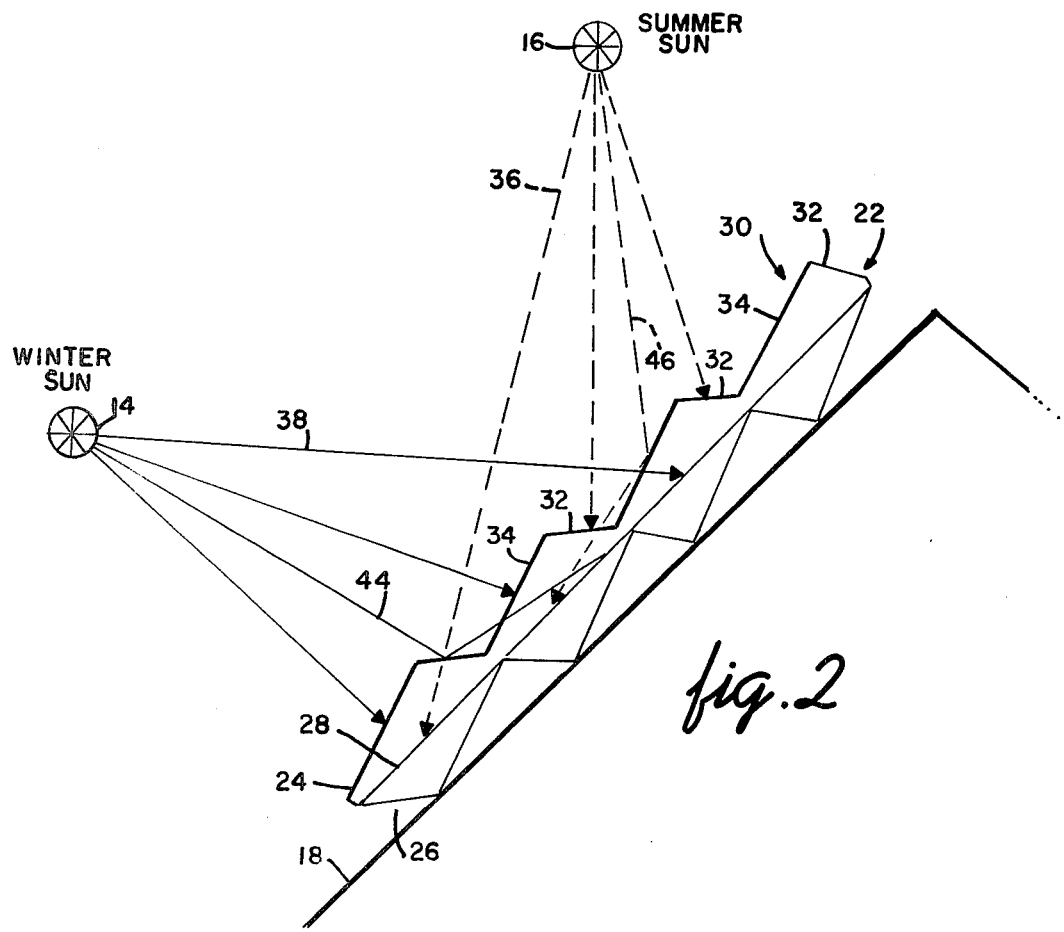
FIG. 2 is a schematic, diagrammatic sectional view of a solar energy tracking collector illustrating the tracking-collecting, feature from summer sun to winter sun.
Figure 3:
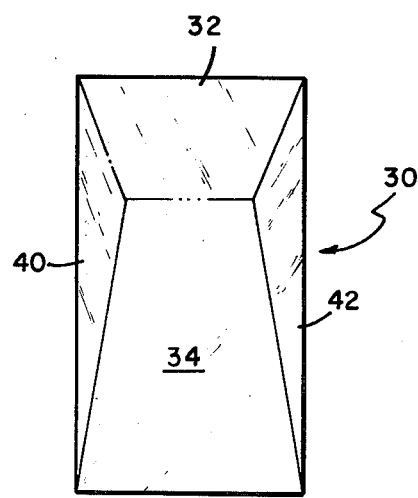
FIG. 3 is a top perspective view of a prism collector of FIG. 2.

Referring now to FIGS. 2 and 3, there is shown a roof represented by the line 18 having the same relative position as dotted line 20 of FIG. 1 with respect to the position of the winter sun 14 and summer sun 16. Positioned on roof 18 is a solar energy collector 22 having a cover 24, and a base 26 and an energy receiving means 28 and being more particularly constructed as described with respect to the embodiment of FIG. 4. The collector 22 is provided with a plurality of prisms 30 having surfaces 32 whose angle with respect to the energy receiving means 28 is optimum for the summer solstice position of the sun 16 as shown by solar radiation 36, and surfaces 34 whose angle with respect to the energy receiving means 28 is optimum for the winter solstice position of sun 14 as shown by solar radiation 38. Surfaces 40 and 42 also provide for collection of the solar radiation as the sun moves laterally relative to the earth's rotation. By the term collection as used herein it is meant collection by direct incidence and by reflection as illustrated by rays 44 and 46. Thus it can be seen that the solar collector of the present invention can be provided with a plurality of prisms having surfaces which are pre-arranged to provide optimum collection of incident solar radiation over a particular angular movement of the sun relative to local position on earth of the solar collector.

Figure 5:
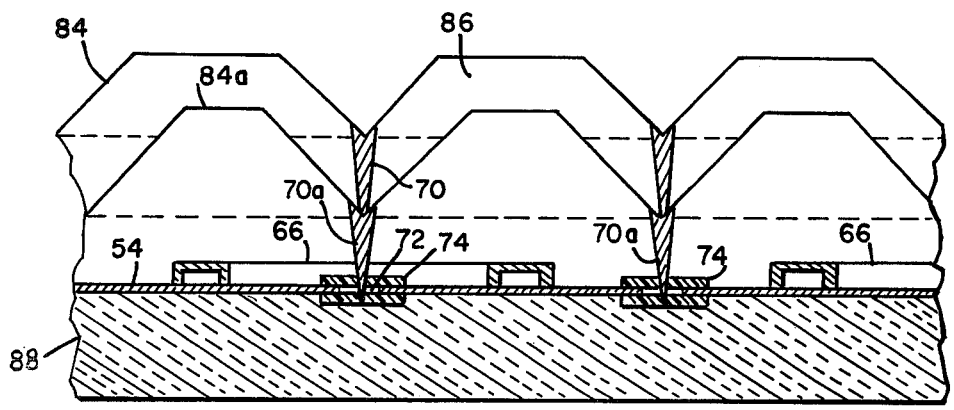
FIG. 5 is a diagrammatic, schematic, sectional view with parts broken away of a modified non-vacuum embodiment of the invention.

Referring now to FIGS. 4, 4A and 5, there is shown a vacuum solar energy collector in accordance with the present invention, which includes a cover or upper portion 48 and a lower or base portion 50. Preferably, the upper cover 48 is molded or formed as one integral structure having a plurality of raised multifaced prismatic-like structures which collect and transmit solar radiation to an energy receiving means 54. The base 50 is molded or formed in the same manner and configuration as cover 48 and is inverted to serve as the base 50. The cover 48 and base 50 are formed of a lightweight high temperature, high strength plastic material such as clear acrylic plastic which will transmit incident solar radiation and minimize heat loss by conduction. One suitable type of plastic is that which is sold under the trade name Lexan which can be molded into an integral structure.

The proper configuration, direction and angle of the surfaces 56, 58, 60 and 62 are selected for the optimum tracking and collection of solar energy as described with respect to FIGS. 1, 2 and 3.

Disposed between the cover 48 and base 50 a radient energy receiving means 54. The energy receiving means 54 is formed of a material which will absorb radiant light energy and convert it to thermal energy. The energy receiving means 54 is preferably a surface formed of a sheet of metal such as, for example, steel, aluminum, or copper. The upper surface of the energy receiving means 54 is provided with a coating 64 which promotes absorption of radiant solar energy. The coating may suitably be black paint or a layer of carbon black.

A heat exchange fluid is circulated in heat exchange relationship with energy absorbing surface 54 by conduit means 66. Conduit means 66 is preferably comprised of metallic tubing, for example copper tubing, provided with a black coating similar to the coating 64. In a preferred embodiment the tubing is of a flat configuration to provide greater area of contact for heating.

In a preferred embodiment the inner surface of the base 50 is provided with an infrared reflecting surface 68 to reflect back to the energy receiving means 54 to minimize heat losses due to radiation from the energy receiving means 54. The infrared reflecting surface 68 may be a highly polished surface such as provided by a metallic coating.

The top cover 48 and base 50 are provided with tips 70, 70a which are preferably tapered to fit securely through and join together inside the holes 72 in the energy receiving surface 54. The energy receiving surface 54 is held in place between the cover 48 and base 50 by washers 74 which are formed of a high temperature resistant, thermally insulating material such as, for example, silicone. In this manner, the energy receiving surface 54 is thermally insulated from the cover 48 and base 50.

The solar collector in this embodiment is provided with conduit means 76 which connects with vacuum pump 78 to evacuate air from within the collector and provide greater thermal insulation. The vacuum pump may be provided with a suitable vacuum gauge and relay system (not shown) well-known to those skilled in the art to automatically start and stop the vacuum pump to maintain a pre-determined vacuum pressure within the solar collector.

In the preferred embodiment the cover 48 and base 50 are provided with extender areas 80 and 80a to increase the distance of the surfaces 56, 58, 60 and 62 from the energy receiving means 54 to provide for improved thermal insulation.

The cover 48 and base 50 are also provided with a peripheral flange or lip 82 and 82a which facilitates sealing of the cover 48 to the base 50 with a high temperature resistant vacuum adhesive well-known to those skilled in the vacuum art.

The non-vacuum embodiment illustrated in FIG. 5 comprises two solar energy collector covers 84, 84a, held in spaced relationship by tips 70 of cover 84 to provide an insulating air space 86. An energy receiving means 54 and heat exchange conduit 66 are provided as described with respect to FIGS. 4, and 4A. Adjacent to the energy receiving means 54 there is provided an insulated base 88.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A solar energy collector comprising: a cover member having a multiplicity of raised surfaces transmissive to solar energy having certain surfaces forming a plurality of tiers of surfaces each arranged with respect to angle and direction to collect solar radiation by direct and reflected transmission as the angle of maximum insolation varies and having a plurality of support members, a base member having a plurality of support members in register with said cover support members for holding said cover member and base member in spaced relationship, a solar energy receiving means disposed between said cover and base members, high temperature resistant thermally insulating means disposed between said support members and said solar energy receiving means, a fluid flow heat exchanger in thermal contact with said solar energy receiving means for conveying collected energy away from said solar energy receiving means.

2. The solar energy collector of claim 1 wherein said inner surface of the base member is reflective to infrared energy.

3. The solar energy collector of claim 1 wherein said solar energy receiving means is provided with a plurality of apertures in register with said support members.

4. A solar energy collector comprising: a cover member having a multiplicity of raised surfaces transmissive to solar energy having certain surfaces forming a plurality of tiers of surfaces each arranged with respect to angle and direction to collect solar radiation by direct and reflected transmission as the angle of maximum insolation varies and having a plurality of support members, a base member having a plurality of support members in register with said cover support members for holding said cover member and base member in spaced relationship, a solar energy receiving means disposed between said cover and base members, high temperature resistant thermally insulating means disposed between said support members and said solar energy receiving means, a fluid flow heat exchanger in thermal contact with said solar energy receiving means for conveying collected energy away from said solar energy receiving means, and means for evacuating said collector.

5. A solar energy collector comprising: an outer and inner cover member each having a multiplicity of raised surfaces transmissive to solar energy having certain surfaces forming a plurality of tiers of surfaces each arranged with respect to angle and direction to collect solar radiation by direct and reflected transmission as the angle of maximum insolation varies, said outer cover member having a plurality of support members for holding said outer cover member and said inner cover member in spaced relationship, a plurality of inner cover support members a solar energy receiving means disposed in spaced relationship from said inner cover member by said plurality of inner cover support members carried by said inner cover member, high temperature resistant thermally insulating means disposed between said inner cover support members and said solar energy receiving means, a fluid flow heat exchanger in thermal contact with said solar energy receiving means for conveying collected energy away from said solar energy receiving means, and an insulated base member adjacent said energy receiving means.

6. A solar energy tracking collector comprising: a cover member having a multiplicity of raised surfaces transmissive to solar energy having certain surfaces forming a plurality of tiers of surfaces each arranged with respect to angle and direction to collect solar radiation by direct and reflected transmission so as to provide maximum solar energy collecting performance during the summer solstice, other tiers of surfaces each arranged with respect to angle, and direction to collect solar radiation by direct and reflected transmission so as to provide maximum solar energy collecting performance during the winter solstice, further tiers of surfaces each arranged to collect solar radiation by direct and reflected transmission so as to provide maximum solar energy collecting performance during the transition from summer solstice to winter solstice and having a plurality of support members, a base member having a plurality of support members in register with said cover support members for holding said cover member and base member in spaced relationship, a solar energy receiving means disposed between said cover and base members, high temperature resistant thermally insulating means disposed between said support members and said solar energy receiving means, a fluid flow heat exchanger in thermal contact with said solar energy receiving means for conveying collected energy away from said solar energy receiving means.

* * * * *